US008311331B2

(12) United States Patent
Nijemcevic et al.

(10) Patent No.: US 8,311,331 B2
(45) Date of Patent: Nov. 13, 2012

(54) RESOLUTION ADJUSTMENT OF AN IMAGE THAT INCLUDES TEXT UNDERGOING AN OCR PROCESS

(75) Inventors: Djordje Nijemcevic, Beograd (RS); Milan Vugdelija, Belgrade (RS); Bodin Dresevic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 12/719,894

(22) Filed: Mar. 9, 2010

(65) Prior Publication Data

US 2011/0222772 A1 Sep. 15, 2011

(51) Int. Cl.
*G06K 9/34* (2006.01)

(52) U.S. Cl. .................................. 382/176; 382/177

(58) Field of Classification Search ............... 382/176, 382/177, 178, 179, 185, 186, 187, 188, 189, 382/198, 199, 200, 229, 230, 289, 290, 291, 382/292; 345/442, 443, 467, 468, 469.1, 345/470
See application file for complete search history.

(56) References Cited

U.S. PATENT DOCUMENTS

| 4,727,588 A | | 2/1988 | Fox et al. | |
|---|---|---|---|---|
| 5,396,566 A | | 3/1995 | Bruce et al. | |
| 5,590,257 A | * | 12/1996 | Forcier | 715/273 |
| 5,956,419 A | * | 9/1999 | Kopec et al. | 382/159 |
| 5,969,795 A | | 10/1999 | Honda | |
| 6,442,578 B1 | * | 8/2002 | Forcier | 715/273 |
| 6,499,042 B1 | * | 12/2002 | Markus | 715/217 |

(Continued)

FOREIGN PATENT DOCUMENTS

JP 2000-331120 A 11/2000

(Continued)

OTHER PUBLICATIONS

International Search Report in corresponding PCT Application No. PCT/US2011/027365, dated Sep. 29, 2011, 8 pages.
Smith, Ray, "An Overview of the Tesseract OCR Engine", Retrieved at <<http://tesseract-ocr.repairfaq.org/downloads/tesseract_overview.pdf>>, Proceedings of the Ninth International Conference on Document Analysis and Recognition—vol. 02, Sep. 23-26, 2007, pp. 629-633.

(Continued)

*Primary Examiner* — Brian Le
(74) *Attorney, Agent, or Firm* — Mayer & Williams PC

(57) ABSTRACT

An optical character recognition process characterizes text lines in a textual image by their base-line, mean-line and x-height. The base-line for at least one text line in the image is determined by finding a parametric curve that maximizes a first fitness function that depends on the values of pixels through which the parametric curve passes and pixels below the parametric curve. The base-line corresponds to the parametric curve for which the first fitness function is maximized. The first fitness function is designed so that it increases with increasing lightless or brightness of pixels immediately below the parametric curve while also increasing with decreasing lightness of pixels through which the parametric curve passes. The mean-line is determined by incrementally shifting the base-line upward by predetermined amounts (e.g., a single pixel) until a second fitness function for the shifted base-line is maximized. The second fitness function is essentially the inverse of the first fitness function. Specifically, the second fitness function increases with increasing lightless of pixels immediately above the shifted base-line while also increasing with decreasing lightness of pixels through which the shifted base-line passes. The x-height is equal to the sum of the predetermined amounts by which the base-line is shifted upward in order to maximize the second fitness function. In some cases different groups of text-lines in the textual image may be characterized differently from one another. For example, each group may be characterized by a most probable x-height for that group.

17 Claims, 3 Drawing Sheets

U.S. PATENT DOCUMENTS

| | | | |
|---|---|---|---|
| 7,430,065 B2 | 9/2008 | Arakai et al. | |
| 2004/0006742 A1* | 1/2004 | Slocombe | 715/513 |
| 2006/0033967 A1 | 2/2006 | Brunner | |
| 2009/0252439 A1 | 10/2009 | Kacher, et al. | |

FOREIGN PATENT DOCUMENTS

| | | |
|---|---|---|
| KR | 10-2009-0004904 A | 1/2009 |
| WO | 2009-137073 A1 | 11/2009 |

OTHER PUBLICATIONS

Aida-Zade, et al., "Word Base Line Detection in Handwritten Text Recognition Systems", <<http://www.waset.org/journals/ijist/v4/v4-1-7.pdf>> In the International Journal of Intelligent Systems and Technologies, 2009, pp. 49-53.

Author Unknown, "Automatic Robotic Book Scanner (Automatic Page Turning)", Retrieved at <<http://www.indususa.com/scanrobotsr301.php>> Oct. 29, 2009, pp. 4.

\* cited by examiner

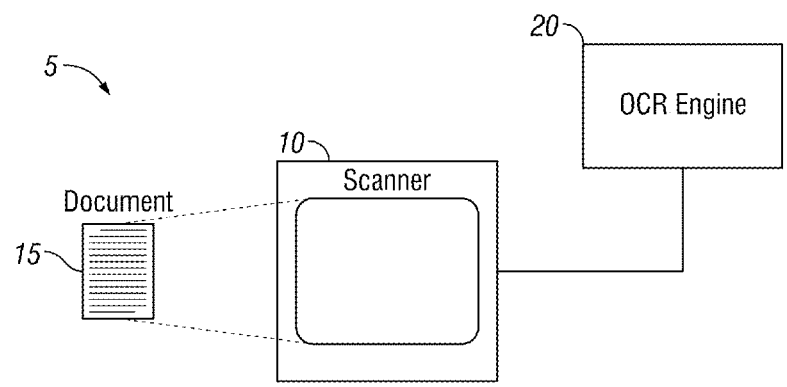
FIG. 1
FIG. 2
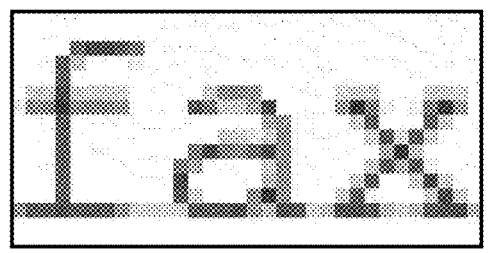
FIG. 3

RESOLUTION ADJUSTMENT OF AN IMAGE THAT INCLUDES TEXT UNDERGOING AN OCR PROCESS

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is obtained from a book or when it is generated by an imager-based scanner, because in these cases the text/picture is scanned from a distance, from varying orientations, and in varying illumination. Even if the performance of scanning process is good, the performance of the OCR engine may be degraded when a relatively low quality page of text is being scanned.

SUMMARY

Optical character recognition requires the identification of the text lines in the textual image in order to identify individual words and characters. The text lines can be characterized by their base-line, mean-line and x-height. Determining these features may be become difficult when the text lines are not perfectly horizontal, which may arise when scanning some classes of documents (for example a thick book) in which the image suffers from non-linear distortions. In such a case, the base-line and mean-line may not be constant over an entire text line.

To overcome these problems, in one implementation the base-line for at least one text line in the image is determined by finding a parametric curve that maximizes a first fitness function that depends on the values of pixels through which the parametric curve passes and pixels below the parametric curve. The base-line corresponds to the parametric curve for which the first fitness function is maximized. The first fitness function is designed so that it increases with increasing lightless or brightness of pixels immediately below the parametric curve while also increasing with decreasing lightness of pixels through which the parametric curve passes.

In some implementations the mean-line can be determined by incrementally shifting the base-line upward by predetermined amounts (e.g., a single pixel) until a second fitness function for the shifted base-line is maximized. The second fitness function is essentially the inverse of the first fitness function. Specifically, the second fitness function increases with increasing lightless of pixels immediately above the shifted base-line while also increasing with decreasing lightness of pixels through which the shifted base-line passes.

In some implementations the x-height can be determined from the base-line and the mean-line which have already been calculated. In particular, the x-height is equal to the predetermined amount by which the base-line is shifted upward in order to maximize the second fitness function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 shows one illustrative example of a system 5 for optical character recognition (OCR) in an image.

FIG. 2 shows an example of a text-line in a scanned image which is not perfectly horizontal.

FIG. 3 illustrates the base-line for the text-line of a single word in a scanned image.

DETAILED DESCRIPTION

Figure 4:
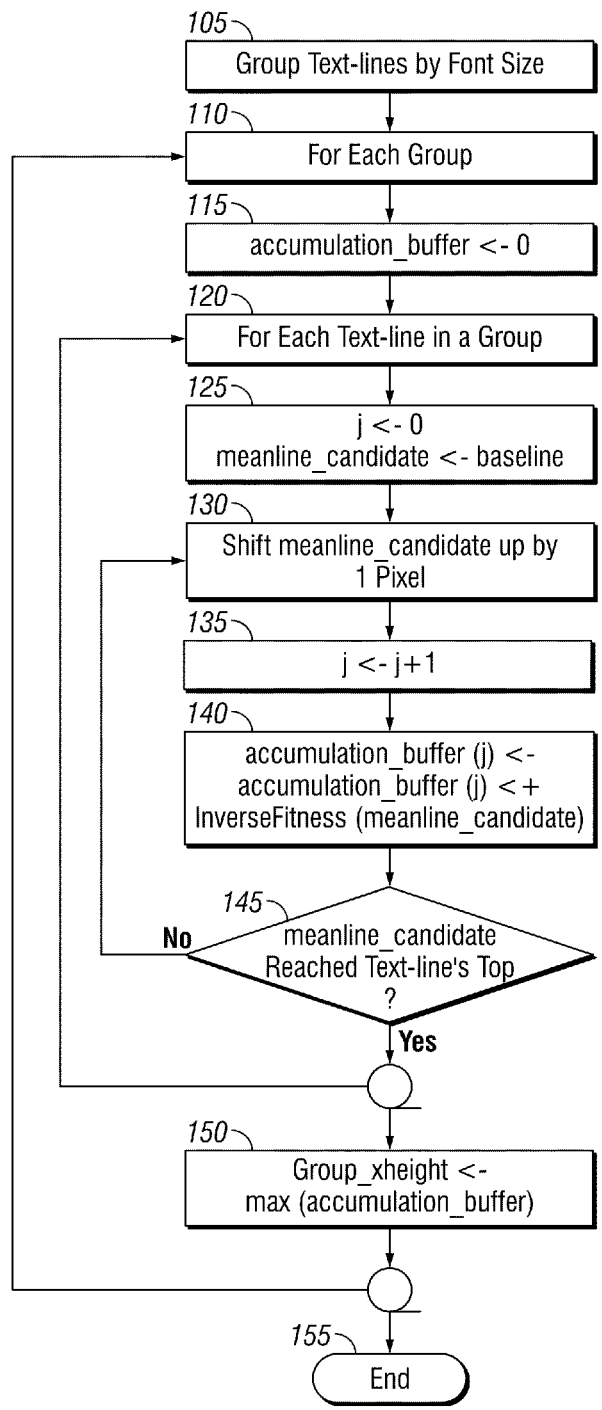
FIG. 4 is a flowchart illustrating a process of determining the x-height for different groups of text lines.

FIG. 1 shows one illustrative example of a system 5 for optical character recognition (OCR) in an image which includes a data capture arrangement (e.g., a scanner 10) that generates an image of a document 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. In this particular example the OCR engine 20 is incorporated into the scanner 10. In other examples, however, the OCR engine 20 may be a separate unit such as stand-alone unit or a unit that is incorporated into another device such as a PC, server, or the like.

The OCR engine 20 receives a textual image as a bitmap of text lines. Three parameters of those text lines that need to be determined are the "base-line," "mean-line," and the "x-height." The "base-line" is defined as a horizontal line passing through the bottom ends of a majority of the characters in a line of text (excluding descenders). Second, the "mean-line" is defined as a horizontal line which passes through the top ends of a majority of the characters in a line of text (excluding ascenders). Third, the "x-height" is defined as the vertical distance between the base-line and the mean-line, which corresponds to the height of a majority of lowercase letters in the line (excluding non-descenders and non-ascenders).

Knowing the precise base-line and x-height is important for a number of reasons, particularly in differentiating between capital and lowercase letters of the same shape. If a text-line is perfectly horizontal and contains only one font style and size, base-line and x-height will hold a constant value over the entire line. Computing these values for a perfectly horizontal text-line is not a difficult task. However, when scanning some classes of documents (for example a thick book), the document image can suffer from non-linear distortions. In such a case, the base-line coordinate is not going to be constant over an entire text line.

An example of a text line containing this artifact is shown in the FIG. 2. It can be seen that the text has a "wavy" appearance, which is caused by the decrease in the average letter position from the line's middle towards the left or right. Artifacts of this nature make it more difficult to determine the base-line.

Extracting x-height information from a textual image can also be problematic. For instance, sometimes a majority of a text line (or even an entire text line) is composed of capital letters or numbers. In such a case, extracting the x-height using the line's bitmap as a unique information source is not reliable. FIG. 2 also shows the base-line, mean-line and x-height.

As detailed below, a method is provided to compute the base-line of a deformed text-line in the form of a parametric curve. Moreover, the most probable x-height value of a given line is estimated using context information obtained from the entire image.

Base-Line Computation

At the outset, two observations can be made from the base-line's definition:

Due to the nature of most fonts, the base-line will overlap with a significant amount of dark pixels originating from letter bottoms.

Immediately below the base-line there are no dark pixels (except for descending letter parts).

Regardless of whether or not the base-line is strictly horizontal or (in case of non-linear deformations) "wavy," it should be possible to establish a simple fitness function based on at least two properties obtained from these observations.

Property 1: As the pixels immediately below the baseline become lighter (i.e., brighter), the value of the fitness function will increase (and vice versa).

Property 2: As the pixels overlapping with the baseline become darker, the value of the fitness function will increase (and vice versa).

The goal of finding the base-line in a given text-line bitmap translates to the problem of finding a (curved) line with a maximal fitness function value.

A rasterized base-line can be implemented as an array: for each x-coordinate of an input bitmap, there should be one and only y-coordinate describing the local baseline value. Keeping this in mind, a simple proposal for the fitness function is:

$$\text{fitness(baseline)} = \sum_{x=0}^{width-1} img[\text{baseline}[x]+1, x] - \sum_{x=0}^{width-1} img[\text{baseline}[x], x]$$

Where:

x and y are horizontal and vertical pixel coordinates respectively (with the origin is at top-left corner)

img[y, x] is the input bitmap's pixel value at location (y, x)

width is the input bitmap's width baseline [x] is a y-coordinate of the base-line at position x It can be observed that the formula for the fitness function satisfies both Property 1 and Property 2. Since the pixel colors in a typical gray-scale image vary from black (value: 0) to white (value: 255), the following will hold true:

As the pixels immediately below the baseline become lighter, the first addend in the formula will become larger.

As the pixels on the baseline become darker, the second addend in the formula will become larger.

A simple diagram of text illustrating this idea is presented in FIG. 3. It can be observed from FIG. 3 that the base-line overlaps with a relatively large number of dark pixels, while pixels immediately below the base-line are completely white.

After defining the criteria that the baseline should fulfill, another question that arises is how "fast" the baseline should change across the text-line width when maximizing the fitness function. Clearly, this rate of change should be sufficient to track the line's "waviness".

On the other hand, the rate of change should not be too fast, because it is not desirable for the bottoms of descending characters to affect the base-line shape. One way to address this issue is to define a base-line candidate through a small set of control parameters, and limiting the range of values each parameter can take. In this way the shape of the base-line candidate can be changed by changing its control parameters.

A curve maximizing the fitness function can be parameterized by defining it through a set of control points connected with straight line segments. The curve's shape can be varied by moving its control points. One way to control the movement of the control point in a manner that achieves good performance results is to only allow the control point to have freedom of movement in the vertical direction. This approach has shown that a set of 4-6 equidistant control points does a good job in modeling a common "wavy" baseline.

A second way of parameterizing the curve for the base-line is by defining it as a B-spline. Changing its shape can be done by varying the spline coefficients.

In general, finding the exact shape that maximizes some fitness function can be thought of as a classical optimization problem which can be solved using well-known techniques. Depending on the nature and number of parameters used to describe the base-line curve, a genetic search, dynamic programming, or some other technique can be used.

If a genetic search is performed, an initial population can be a set of curves with parameters randomly set within some reasonable range. New offspring can be formed by taking two high-fitness curves and mixing their parameters into a new curve. Mutation can be done by slightly varying curve parameters.

The curve parameters can be optimized by dynamic programming as well. The solution requires finding an optimal path starting at the text-line's left side and moving towards its right side, while obeying the spatial constraints imposed by the common curve shape.

X-Height Computation

The mean-line (a line determining where non-ascending lowercase letters terminate) can be computed in a way quite similar to the base-line computation procedure described above. Actually, it is enough to invert the fitness function described above and re-run the algorithm. That is, the fitness function for the mean-line should satisfy the following two properties:

Property 1: As the pixels immediately above the baseline become lighter, the value of the fitness function will increase (and vice versa).

Property 2: As the pixels overlapping with the baseline become darker, the value of the fitness function will increase (and vice versa).

Once the mean-line is determined, the x-height can then be extracted by simply subtracting the corresponding mean-line and base-line coordinates. However, this process introduces an additional computational load, effectively doubling the entire feature extraction execution time.

In practice, non-linear deformations of the type discussed herein have no influence on individual letter dimensions. In other words, the x-height does not change across the "wavy" text-line, provided that the line contains letters of the same font style and size. This conclusion facilitates the process of computing the x-height since it directly implies that the curves for the mean-line and the base-line will have exactly the same shape. Accordingly, the mean-line can be computed in the following way: the curve for the base-line is shifted pixel by pixel towards the text-line's top, and the inverted fitness function is computed each time the curve is shifted upward. The shifted curve that results when the fitness function reaches its maximum value will be the mean-line. The number of pixels by which the base-line curve is shifted upward to obtain the mean-line is equal to the x-height.

Sometimes an input bitmap of an individual text-line cannot be used as the only source of information to obtain a single value for x-height over an entire image. For example, some text lines may be short lines composed of numbers only. Another example is a caption that is in all capital letters. Because of such cases, the x-height computation may sometimes be performed in a somewhat more sophisticated manner.

In this implementation, before computing the x-height, it is determined whether the text-lines in the images should be divided into different groups that are each likely to contain text-lines with different x-heights. Such text-line groups may be determined in a variety of different ways. For instance, text-lines may be grouped according to their dominant letter stroke width. This approach essentially assumes that different x-heights arise from the use of different fonts and font sizes and that each such font and font size is characterized by a different dominant stroke width. Thus, groups of text lines with a common dominant stroke width likely have a common x-height.

The dominant stroke width may be determined at this stage of the OCR process or it may have been determined in an earlier stage of processing which precedes the text line analysis described herein. One example of a method for determining stroke width is shown in U.S. patent application Ser. No. 12/720,732, which is hereby incorporated by reference in its entirety.

In one alternative, instead of grouping text lines by their dominant stroke width, individual words can be divided into their own groups.

To determine the x-height of a particular group, begin by defining a mean-line candidate [j] as a base-line's curve shifted by j pixels up. Next, for each group, a common buffer is established. For each text-line in a group, an inverted fitness function of the mean-line candidate [j] is added to the buffer. At the end of the process, the buffer's element j will contain a sum of inverted fitness functions for all the mean-line candidates [j] within the particular group. The most-probable x-height value for the particular group corresponds to the value of j for which the buffer has its maximum value.

A flowchart illustrating the process of determining the x-height for different groups of text lines is shown in FIG. 4. The process begins in step 105 when the text-lines in an image are divided into groups by any appropriate criterion such as font size, dominant stroke width, or the like. For each group, the process continues from step 110 to step 115 in which an accumulation buffer is established and initialized to a value of zero. Next, for each text line within the group the process proceeds from step 120 to step 125 in which j is initialized to zero and the mean-line candidate is initialized to the base-line. The value of j is incremented by 1 in step 135, which corresponds to shifting the base-line curve upwards by one pixel. The fitness function for this mean-line (which corresponds to the inverse fitness function of the base-line) is calculated in step 140. Also in step 140, the accumulation buffer is defined as the sum of its previous value and the value of the fitness function that has just been calculated. Decision step 145 then determines if the maximum value of the accumulation buffer has been reached. If so, then in step 150 the current value of j corresponding to this maximum value is determined to be the x-height for this group. Alternatively, if the maximum value of the accumulation buffer has not been reached, the process proceeds from decision step 145 back to step 130 in which the current mean-line is shifted upward by 1 pixel. This process continues until the maximum value of the accumulation buffer has been reached. Once the x-height value has been determined for this group the process returns to step 120 and repeats for any remaining groups of text lines, finally ending at step 155.

Figure 5:
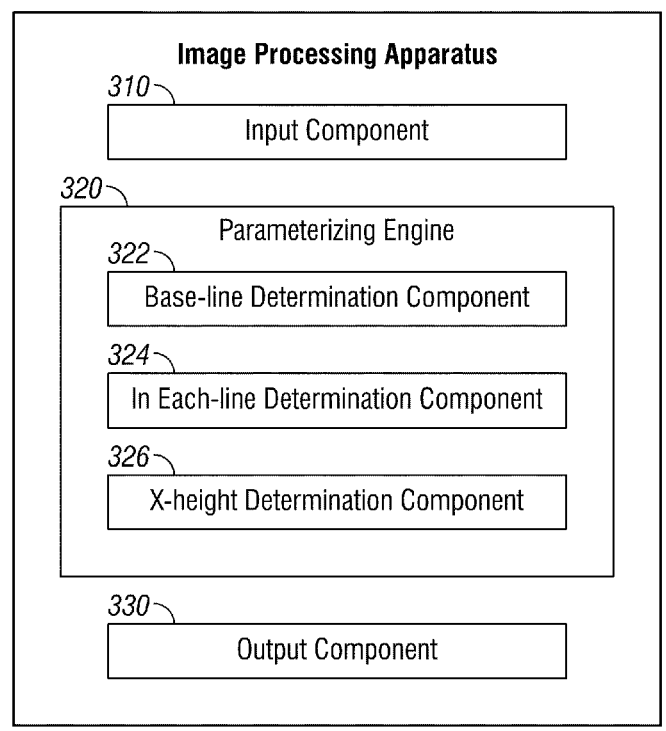
FIG. 5 shows one example of an image processing apparatus that may perform the process of extracting information concerning the text-lines in a textual image.

FIG. 5 shows one example of an image processing apparatus 300 that may perform the process of extracting information concerning the text-lines in a textual image. The apparatus, which may be incorporated in an OCR engine, can be used by the OCR engine to determine the base-line, mean-line and x-height of the text lines in the image. The apparatus includes an input component 302 for receiving an input image and a parameterizing engine 310 for finding parametric curves that correspond to the base-line and the mean-line of the text lines in the image. The parameterizing engine 310 includes a base-line determination component 322, a mean-line determination component 324 and an x-height determination component 324. The apparatus 300 also includes an output component 330 that generates the information concerning the text-lines in a form that allows it to be employed by subsequent components of the OCR engine.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system that extracts information which characterized text lines in an image, comprising:
   an input component for receiving a bitmap of an input image that includes text lines; and a parameterizing engine that determines a base-line for at least one text line in the image by finding a parametric curve that maximizes a fitness function that depends on values of pixels through which the parametric curve passes and pixels below the parametric curve, wherein the base-line corresponds to the parametric curve for which the fitness function is maximized, wherein the fitness function is defined as fitness(baseline) and is equal to $$\text{fitness(baseline)} = \sum_{x=0}^{width-1} img[\text{baseline}[x]+1, x] - \sum_{x=0}^{width-1} img[\text{baseline}[x], x]$$

where:
x and y are horizontal and vertical pixel coordinates respectively;
img[y, x] is a pixel value of the bitmap at location (y, x);
width is a width of bitmap input image; and
baseline[x] is a y-coordinate of the base-line at position x.

2. The system of claim 1 wherein at least one control parameter constrains at least one feature of the parametric curve.

3. The system of claim 2 wherein the feature of the parametric curve that is determined by the control parameter is a maximum rate of change of the parametric curve along the text line.

4. The system of claim 1 wherein the parametric curve includes a plurality of control points connected by straight lines, wherein the control points are constrained to move only in a vertical direction.

5. The system of claim 1 wherein the parametric curve is defined as a B-spline having a shape that is determined by its spline coefficients.

6. The system of claim 1 further comprising maximizing the fitness function using an optimization technique is selected from the group consisting of a genetic search and dynamic programming.

7. The system of claim 1 wherein the parameterizing engine further comprises a mean-line determination component that determines a mean-line for the at least one line of text.

8. The system of claim 7 wherein the mean-line determination component determines the mean-line by maximizing a second fitness function for a second parametric curve, wherein the second fitness function increases with increasing lightless of pixels immediately above the second parametric curve and also increases with decreasing lightness of pixels through which the second parametric curve passes.

9. The system of 8 wherein the mean-line determination component determines the mean-line by:
incrementally shifting the base-line upward by predetermined amounts until a second fitness function for the shifted base-line is maximized, wherein the second fitness function increases with increasing lightless of pixels immediately above the shifted base-line and also increases with decreasing lightness of pixels through which the shifted base-line passes.

10. The system of claim 9 further comprising an x-height determination component that determines an x-height for the at least one text line, wherein the x-height is equal to a predetermined amount by which the base-line is shifted upward in order to maximize the second fitness function.

11. The system of claim 1 wherein the parameterizing engine determines a different x-height for different groups of text-lines in the input image.

12. The system of claim 11 wherein the parameterizing engine divides the text-lines in the input image into groups based on their dominant stroke-width.

13. The system of claim 1 wherein the parameterizing engine determines a most probable x-height for different groups of text-lines in the input image based on an inverted fitness function of a mean-line candidate for each text-line in the group.

14. A method for extracting information which characterized text lines in an image, comprising:
receiving a bitmap of an input image that includes text lines; and
determining a base-line for at least one text line in the image by finding a parametric curve that maximizes a fitness function that depends on values of pixels through which the parametric curve passes and pixels below the parametric curve, wherein the base-line corresponds to the parametric curve for which the fitness function is maximized, wherein the fitness function increases with increasing lightless of pixels immediately below the parametric curve and also increases with decreasing lightness of pixels through which the parametric curve passes and is defined as fitness(baseline) and is equal to $$\text{fitness(baseline)} = \sum_{x=0}^{width-1} img[\text{baseline}[x]+1, x] - \sum_{x=0}^{width-1} img[\text{baseline}[x], x]$$

where
x and y are horizontal and vertical pixel coordinates respectively;
img[y, x] is a pixel value of the bitmap at location (y, x);
width is a width of bitmap input image; and
baseline[x] is a y-coordinate of the base-line at position x.

15. The method of claim 14 further comprising maximizing the fitness function using an optimization technique selected from the group consisting of a genetic search and dynamic programming.

16. The method of claim 14 further comprising determining a mean-line for the at least one line of text by incrementally shifting the base-line upward by predetermined amounts until a second fitness function for the shifted base-line is maximized, wherein the second fitness function increases with increasing lightless of pixels immediately above the shifted base-line and also increases with decreasing lightness of pixels through which the shifted base-line passes.

17. The method of claim 16 further comprising determining an x-height for the at least one text line, wherein the x-height is equal to a sum of the predetermined amounts by which the base-lines is shifted upward in order to maximize the second fitness function.

* * * * *